United States Patent
Hobbs et al.

(10) Patent No.: US 12,353,226 B2
(45) Date of Patent: Jul. 8, 2025

(54) CONTROL SYSTEM FOR ONE OR MORE ABLUTIONARY DEVICES

(71) Applicant: Kohler Mira Limited, Gloucesterhire (GB)

(72) Inventors: Barry Steven Hobbs, Cheltenham (GB); Mark Frederick Florencio Barton, Cheltenham (GB); Charles Maxwell Parker, Cheltenham (GB)

(73) Assignee: Kohler Mira Limited, Cheltenham (GB)

( * ) Notice: Subject to any disclaimer, the term of this patent is extended or adjusted under 35 U.S.C. 154(b) by 127 days.

(21) Appl. No.: 17/502,935

(22) Filed: Oct. 15, 2021

(65) Prior Publication Data
US 2022/0121228 A1 Apr. 21, 2022

(30) Foreign Application Priority Data
Oct. 19, 2020 (GB) .................................... 2016537

(51) Int. Cl.
*G05D 23/13* (2006.01)
*E03C 1/02* (2006.01)
*E03C 1/04* (2006.01)

(52) U.S. Cl.
CPC ......... *G05D 23/1353* (2013.01); *E03C 1/023* (2013.01); *E03C 1/041* (2013.01); *G05D 23/1393* (2013.01); *E03C 1/0408* (2013.01)

(58) Field of Classification Search
CPC ....... F16K 11/22; F16K 11/24; G05B 23/027; G05D 7/0635; G05D 23/1353; G05D 23/134
(Continued)

(56) References Cited

U.S. PATENT DOCUMENTS 5,358,177 A * 10/1994 Cashmore .......... G05D 23/1393
 137/332
10,533,770 B1  1/2020 O'Keeffe et al.
(Continued)

FOREIGN PATENT DOCUMENTS

CN     103562607 A    2/2014
JP     62-284132      12/1987
WO     WO-2007/007093  1/2007

OTHER PUBLICATIONS

GB Combined Search and Examination Report on GB 2016537.9 dated Apr. 20, 2021; 6 pages.
(Continued)

*Primary Examiner* — Nelson J Nieves
*Assistant Examiner* — Meraj A Shaikh
(74) *Attorney, Agent, or Firm* — Husch Blackwell LLP

(57) ABSTRACT

A control system for one or more ablutionary devices, comprising: a mixer valve having a first inlet and a second inlet configured to receive a supply of hot and cold water, and an outlet configured to output cold water, hot water or a mixture thereof as an output stream for suppling water to the one or more ablutionary devices downstream of the mixer valve; and a controller in communication with the mixer valve. The controller is configured to control the mixer valve according to one or more target output water properties; obtain one or more operating signals each related to an operating parameter of the control system; and generate, based on the one or more operating signals, a diagnostic signal that indicates an associated failure mode of the water supply if the mixer valve cannot be controlled to reach the one or more target water output properties.

20 Claims, 7 Drawing Sheets

(58) Field of Classification Search
 USPC .............................................. 236/12.1, 12.15
 See application file for complete search history.

(56) References Cited

U.S. PATENT DOCUMENTS

| | | | |
|---|---|---|---|
| 2002/0153425 A1 | 10/2002 | Mountford et al. | |
| 2004/0041033 A1 | 3/2004 | Kemp | |
| 2005/0072239 A1* | 4/2005 | Longsdorf | G05B 23/027 |
| | | | 702/56 |
| 2006/0112953 A1 | 6/2006 | Gougerot et al. | |
| 2006/0231638 A1* | 10/2006 | Belz | G05D 23/1393 |
| | | | 236/12.12 |
| 2007/0228181 A1* | 10/2007 | Robinson | F16K 11/20 |
| | | | 236/12.11 |
| 2009/0014469 A1 | 1/2009 | Bawcom | |
| 2009/0159017 A1 | 6/2009 | Tsuge | |
| 2010/0206956 A1* | 8/2010 | Gautschi | E03C 1/0412 |
| | | | 236/12.12 |
| 2012/0037095 A1 | 2/2012 | Duplessis | |
| 2012/0216893 A1 | 8/2012 | Shapira | |
| 2014/0026970 A1* | 1/2014 | DuPlessis | G05D 23/132 |
| | | | 236/12.15 |
| 2016/0334807 A1 | 11/2016 | Song | |
| 2017/0350101 A1 | 12/2017 | Lee et al. | |
| 2018/0094413 A1 | 4/2018 | Chaky | |
| 2018/0163993 A1 | 6/2018 | Goodjohn et al. | |
| 2020/0072373 A1 | 3/2020 | Noboa et al. | |

OTHER PUBLICATIONS

Chinese Official Action dated Dec. 8, 2022, issued in corresponding Chinese application.
Chinese Official Action dated Jun. 21, 2023 issued in corresponding Chinese application.
Chinese Official Action dated Oct. 17, 2023, issued in corresponding Chinese application.

* cited by examiner

CONTROL SYSTEM FOR ONE OR MORE ABLUTIONARY DEVICES

CROSS-REFERENCE TO RELATED PATENT APPLICATIONS

The present application claims the benefit of and priority to United Kingdom Application No. GB 2016537.9, filed Oct. 19, 2020, the entire disclosure of which, including the specification, drawings, claims and abstract, is incorporated herein by reference.

BACKGROUND

The present application relates to a control system for one or more ablutionary devices such as a shower system, a tap, faucet or the like or any combination of such ablutionary devices. The present application also relates to a method performed by such a control system. More specifically, the present application relates to the control of an electronically controlled ablutionary device such as a digital shower or tap.

Electronically controlled, or digital, showers and taps can include a mixer valve unit that is provided with a cold water and a hot water input from which a blended output stream is produced in response to an electrical control signal. A temperature sensor can be used in the output stream to create a feedback loop in order to control the temperature of the output stream by blending appropriate levels of the input hot and cold water. The feedback loop is used to maintain the output stream at a target temperature.

In a digital shower or tap system the temperature and flow of the output stream can be controlled remotely by the user with a separate user interface. This is usually located remotely from the mixer valve unit so that the mixer valve unit and user interface form a control system. The user interface allows the user to set a desired water output property, such as the desired temperature and/or flow rate, and can provide more complex control functionality such as allowing pre-programmed or custom shower experiences to be provided.

Digital shower/tap systems have a number of advantages in terms of improved functionality and user experience by giving greater and more convenient control of the output water stream. The drawbacks of these systems however may include difficulty diagnosing problems with the output water stream not being as desired. For example, it can sometimes be difficult to determine whether the digital control system itself is at fault (and if so, which of its components is not operating correctly), or if the problem lies with the water supply. Moreover, the mixer valve unit often may be installed in a loft space or under a bath where it is not easily accessed for fault checking. An incorrectly diagnosed fault may result in an unnecessary call out of a service engineer or the unnecessary servicing or replacement of parts.

A general problem to be addressed therefore is how to provide improved diagnostics of a control system for an ablutionary device.

SUMMARY

An exemplary embodiment relates to a control system for one or more ablutionary devices, which includes a mixer valve having a first inlet and a second inlet configured to receive a supply of hot and cold water, and an outlet configured to output cold water, hot water, or a mixture thereof as an output stream for suppling water to the one or more ablutionary devices downstream of the mixer valve; and a controller in communication with the mixer valve, the controller configured to: control the mixer valve according to one or more target output water properties; obtain one or more operating signals each related to an operating parameter of the control system; and generate, based on the one or more operating signals, a diagnostic signal that indicates an associated failure mode of the water supply if the mixer valve cannot be controlled to reach the one or more target water output properties.

Another exemplary embodiment relates to a method performed by a control system for one or more ablutionary devices, the control system includes a mixer valve having a first inlet and a second inlet configured to receive a supply of hot and cold water and an outlet configured to output cold water, hot water or a mixture thereof as an output stream for suppling water to the one or more ablutionary devices downstream of the mixer valve. The method includes controlling the mixer valve according to one or more target output properties; obtaining one or more operating signals each related to an operating parameter of the control system; and generating a diagnostic signal, based on the one or more operating signals, that indicates an associated failure mode of the water supply if the mixer valve cannot be controlled to reach the target water output properties.

BRIEF DESCRIPTION OF THE DRAWINGS

Embodiments of the invention will now be described, by way of example only, with reference to the accompanying drawings, in which.

DETAILED DESCRIPTION

Figure 1:
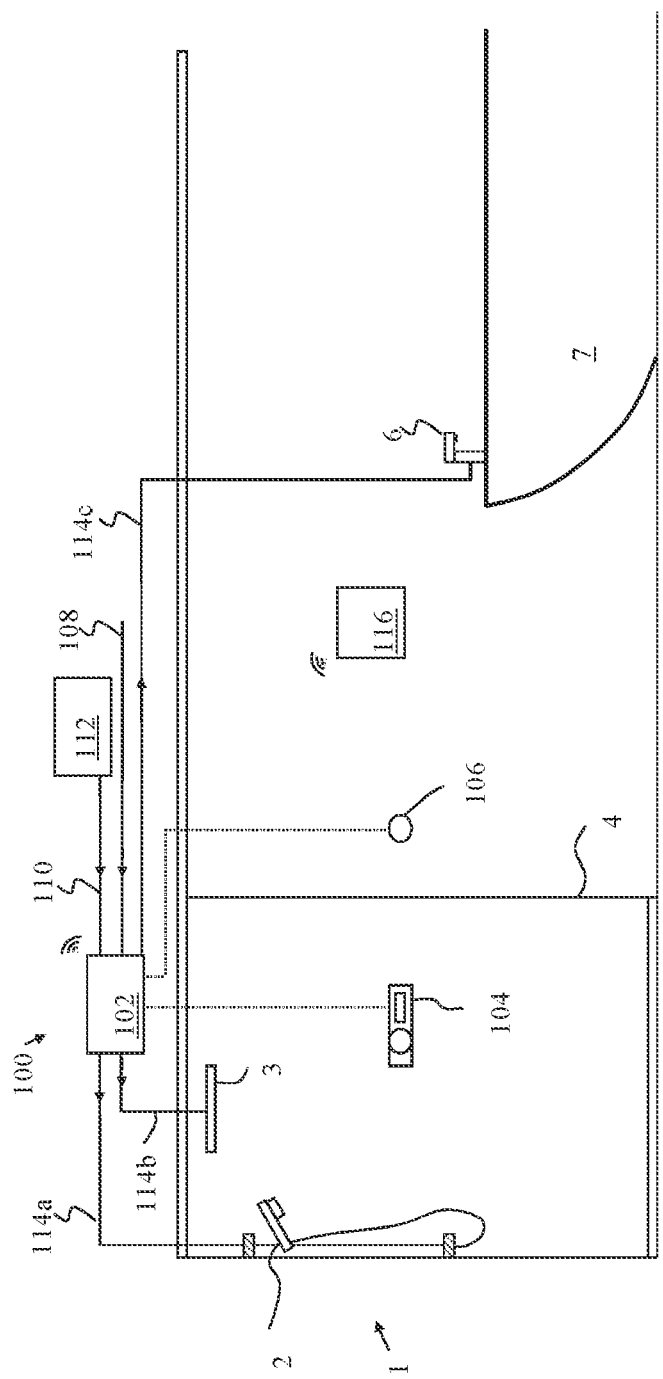
FIG. 1 shows a schematic side view of an ablutionary device having a control system according to an embodiment.

A first aspect provides a control system for one or more ablutionary devices, comprising any one or more of: a mixer valve having a first inlet and a second inlet configured to receive a supply of hot and cold water, and an outlet configured to output cold water, hot water or a mixture thereof as an output stream for suppling water to the one or more ablutionary devices downstream of the mixer valve; and a controller in communication with the mixer valve, the controller configured to: control the mixer valve according to one or more target output water properties; obtain one or more operating signals each related to an operating parameter of the control system; generate, based on the one or more operating signals, a diagnostic signal that indicates an associated failure mode of the water supply if the mixer valve cannot be controlled to reach the one or more target water output properties.

The control system provides improved diagnostic functionality by determining if the water being supplied to the mixer valve is sufficient to provide the desired water output based on operating parameters of the control system. The diagnostic signal allows a problem with the water supply to be distinguished from a fault with the control system itself. This can allow the fault to be correctly diagnosed and avoid the need for unnecessary servicing or replacement of parts of the ablutionary device or the control system.

The one or more operating signals may include a hot water temperature signal indicative of the temperature of hot water flowing through or being supplied to one of the first or second inlets. The controller may be configured to receive the hot water temperature signal and generate the diagnostic signal based at least partly on the hot temperature signal. The control system may further comprise a temperature sensor arranged to generate the hot water temperature signal.

The controller may be configured to compare the hot water temperature signal and a target water output temperature of the one or more target output water properties in order to generate the diagnostic signal. If the comparison indicates that the temperature of hot water being supplied to the mixer valve is not greater than a threshold amount above the target water output temperature the diagnostic signal is generated to indicate an insufficient hot water supply temperature failure mode.

The controller may be configured to compare the hot temperature signal and a maximum system limit in order to generate the diagnostic signal. If the comparison indicates that the temperature of water being supplied to the mixer valve is greater than the maximum system limit, the diagnostic signal is generated to indicate an excess hot water temperature supply failure mode.

The one or more operating signals may include a cold water temperature signal indicative of the temperature of cold water being supplied to the mixer valve. The control system may further comprise a second temperature sensor arranged to generate the cold water temperature signal.

The controller may be configured to receive the cold water temperature signal; and: a) compare the cold water temperature signal and the target water output temperature in order to generate the diagnostic signal, wherein if the comparison indicates that the temperature of cold water being supplied to the mixer valve is not at least a threshold amount below the target water output temperature the diagnostic signal is generated to indicate an excess cold water supply temperature failure mode, and/or b) compare the cold temperature signal and a minimum system limit in order to generate the diagnostic signal, wherein if the comparison indicates that the temperature of water being supplied to the mixer valve is below the minimum system limit, the diagnostic signal is generated to indicate a cold water temperature supply too low failure mode. If a) the comparison between the cold temperature signal and the target water output temperature and/or minimum system limit indicates that the temperature of cold water being supplied to the mixer valve is respectively at least a threshold amount below the target water output temperature and/or is below the minimum system limit; and b) the comparison between the hot temperature signal and the target water output temperature and/or maximum system limit indicates that the temperature of hot water being supplied to the mixing valve is respectively greater than a threshold amount above the target water output temperature and/or is less than the maximum system limit, the diagnostic signal may be generated to indicate that the cold and/hot water is within a suitable range, but a potential hot and/or cold water supply low pressure or restricted or blocked first inlet, second inlet, and/or outlet failure mode is present.

The control system may further comprise an output stream flow rate sensor arranged to generate an output stream flow rate signal indicative of the rate of flow of the output stream of the mixer valve. The controller may be configured to: receive the output stream flow rate signal; and compare the output stream flow rate signal to a threshold value, and if the comparison indicates that the output stream flow rate is less than the threshold value, the diagnostic signal may be generated to indicate a blocked or restricted hot and/or cold water supply failure mode, or blocked or restricted outlet failure mode.

The mixer valve may comprise first and second valve members arranged to control flow between the inlets and the outlet. The controller may be configured to control the position of the valve members in order to control the output stream. The one or more operating signals may include a target or actual position of the first, second or both of the valve members.

Generating the diagnostic signal may comprise comparing the valve member target or actual position to a closed threshold and an open threshold, and determining which one or both of the valve member positions are below or exceed the respective closed or open threshold in order to determine the failure mode indicated by the diagnostic signal.

Generating the diagnostic signal may comprise combining the valve member position comparison and the temperature signal comparisons, whereby if the hot and cold temperature signals are determined to be within normal operating conditions, the controller may be arranged to determine which of the hot inlet or cold inlet pressure is too high or too low, or which the hot or cold inlet or outlet is restricted or blocked based on the valve member position comparison.

Generating the diagnostic signal may comprise combining the valve member signal comparison and the output stream flow rate signal comparison to determine which of: i) the hot inlet is blocked, ii) the cold inlet is blocked, iii) both hot and cold inlets are blocked, or iv) if both the hot inlet and cold inlet pressure is insufficient or both of the inlets are restricted.

An excess cold and hot pressure failure mode diagnostic signal may be generated if both of the first and second valve member signals are below the closed threshold.

A hot and cold pressure too low, both the hot and cold is restricted or blocked, flow demand too high, or outlet blocked or restricted failure mode diagnostic signal may be generated if both of the first and second valve member signals exceed the open threshold.

The controller may be further configured to control the mixer valve in response to the diagnostic signal.

The controller may be arranged to control the mixer valve to at least temporarily reduce the flow rate of hot and/or cold water through the mixer valve or change the one or more target output water properties in response to the diagnostic signal.

The controller may be configured to stop water flow in response to the diagnostic signal.

The control system may further comprise a flow shut-off valve downstream of the mixer valve. The controller may be configured to close the flow shut off valve in response to the diagnostic signal.

The flow of water may be stopped if reducing the flow rate does not result in a return towards the desired output water stream property.

The controller may be arranged to send or transmit the diagnostic signal. The controller may be configured to send the diagnostic signal to a user interface and/or a remote device for display and/or storage.

The controller may be configured to send the diagnostic signal via a wireless connection (e.g. Bluetooth or WiFi network) or via a wired connection. The controller may be arranged to send the diagnostic sign over a wireless network to a server at a location remote from the control system.

The controller may further comprise a memory, and the diagnostic signal may be stored in the memory by the controller.

The control system may be used to supply multiple water outputs of the same ablutionary device (e.g. two or more separate shower heads, taps, etc). A pipework manifold may be provided downstream of the mixer valve at which the output stream is divided amongst separate conduits for each water output. The control system may comprise a number of shut-off valves (e.g. formed by solenoids) to control the flow in each of the separate conduits.

In a second aspect the present application provides a method performed by a control system for one or more ablutionary devices, the control system comprising a mixer valve having a first inlet and a second inlet configured to receive a supply of hot and cold water and an outlet configured to output cold water, hot water or a mixture thereof as an output stream for suppling water to the one or more ablutionary devices downstream of the mixer valve, the method comprising one or more of: controlling the mixer valve according to one or more target output properties; obtaining one or more operating signals each related to an operating parameter of the control system; and generating a diagnostic signal, based on the one or more operating signals, that indicates an associated failure mode of the water supply if the mixer valve cannot be controlled to reach the target water output properties.

The one or more operating signals may include a hot water temperature signal indicative of the temperature of water flowing through or being supplied to one of the first or second inlets. Obtaining one or more operating signals may comprise receiving the hot water temperature signal, and the diagnostic signal may be generated based at least partly on the hot water temperature signal.

Generating the diagnostic signal may comprise comparing the hot temperature signal and a target water output temperature of the one or more target output water properties in order to generate the diagnostic signal. If the comparison indicates that the temperature of water being supplied to the mixer valve is not greater than a threshold amount above the target water output temperature the diagnostic signal may be generated to indicate an insufficient hot water supply temperature failure mode.

Generating the diagnostic signal may comprise comparing the hot temperature signal to a maximum system limit in order to generate the diagnostic signal. If the comparison indicates that the temperature of water being supplied to the mixer valve is greater than the maximum system limit, the diagnostic signal may be generated to indicate an excess hot water supply temperature failure mode.

The one or more operating signals may include a cold water temperature signal indicative of the temperature of cold water being supplied to the mixer valve, and the diagnostic signal may be generated based at least partly on the cold water temperature signal.

Obtaining the one or more operating signals may comprise receiving the cold water temperature signal. Generating the diagnostic signal may comprise a) comparing the cold water temperature signal and the target water output temperature in order to generate the diagnostic signal, wherein if the comparison indicates that the temperature of cold water being supplied to the mixer valve is not at least a threshold amount below the target water output temperature the diagnostic signal is generated to indicate an excess cold water supply temperature failure mode; and/or b) comparing the cold temperature signal and a minimum system limit in order to generate the diagnostic signal, wherein if the comparison indicates that the temperature of water being supplied to the mixer valve is below the minimum system limit, the diagnostic signal is generated to indicate an cold water temperature supply too low failure mode. If a) the comparison between the cold temperature signal and the target water output temperature and/or the minimum system limit indicates that the temperature of cold water being supplied to the mixer valve is respectively at least a threshold amount below the target water output temperature and/or is below the minimum system limit; and b) the comparison between the hot temperature signal and the target water output temperature and/or maximum system limit indicates that the temperature of hot water being supplied to the mixing valve is respectively greater than a threshold amount above the target water output temperature and/or less than the maximum system limit, the diagnostic signal may be generated to indicate that the cold and/hot water is within a suitable range, but a potential hot and/or cold water supply low pressure or restricted or blocked first inlet, second inlet, and/or outlet failure mode is present.

The one or more operating signals may include an output stream flow rate signal indicative of the rate of flow of the output stream of the mixer valve. Generating the diagnostic signal may comprise comparing the output stream flow rate signal to a threshold value, and if the comparison indicates that the output stream flow rate is less than the threshold value, the diagnostic signal is generated to indicate a blocked or restricted hot and/or cold water supply failure mode, or blocked or restricted outlet failure mode.

Controlling the mixer valve may comprise controlling the position of first and second valve members provided in the mixer valve to control flow between the inlets and outlet. The one or more operating signals may include a target or actual position of the one or more valve members.

Generating the diagnostic signal may comprise comparing the valve member target or actual position to a closed threshold and an open threshold, and determining which one or both of the valve member positions are below or exceed the respective closed or open threshold in order to determine the failure mode indicated by the diagnostic signal.

Generating the diagnostic signal may comprise combining the valve member position comparison and the temperature signal comparisons, whereby if the hot and cold temperature signals are determined to be within normal operating conditions, the controller may be arranged to determine which of the hot inlet or cold inlet pressure is too high or too low, or which the hot or cold inlet or outlet is restricted or blocked based on the valve member position comparison.

Generating the diagnostic signal may comprise combining the valve member signal comparison and the output stream flow rate signal comparison to determine which of: i) the hot inlet is blocked, ii) the cold inlet is blocked, iii) both hot and cold inlets are blocked, or iv) if both the hot inlet and cold inlet pressure is insufficient or both of the inlets are restricted.

An excess cold and hot pressure failure mode diagnostic signal may be generated if both of the first and second valve member signals are less than the closed threshold.

A hot and cold pressure too low, both the hot and cold is restricted or blocked, flow demand too high, or outlet blocked or restricted failure mode diagnostic signal may be generated if both of the first and second valve member signals exceed the open threshold.

The method may comprise monitoring an actual valve position signal indicative of an actual position of the one or more valve members by performing a comparison to a threshold value, and generate the based on the threshold comparison.

The method may further comprise controlling the mixer valve in response to the diagnostic signal.

Controlling the mixer valve in response to the diagnostic signal may comprise controlling the mixer valve to at least temporarily reduce the flow rate of hot and/or cold water through the mixer valve or change the one or more target output water properties in response to the diagnostic signal. Controlling the mixer valve in response to the diagnostic signal may further comprise stopping water flow in response to the diagnostic signal.

The method may comprise sending or transmitting the diagnostic signal. The method may comprise sending the diagnostic signal to a user interface and/or a remote device for display and/or storage. The diagnostic signal may be sent via a wireless connection (e.g. Bluetooth or WiFi network) or via a wired connection. The method may comprise sending the diagnostic signal over a wireless network to a server.

The method may further comprise storing the diagnostic signal in a local memory.

The skilled person will appreciate that except where mutually exclusive, a feature described in relation to the first aspect may be applied to the second aspect. The method of the second aspect may be performed by the control system of the first aspect.

FIG. 1 illustrates a first ablutionary device 1 that is in the form of a shower system. The shower system comprises two water outlets: a first water outlet that is a wall mounted shower head 2 and a second water outlet that is an overhead shower head 3. The water outlets are mounted within a shower enclosure 4. FIG. 1 also shows a second ablutionary device in the form of a spout 6 that provides water to a bath tub 7.

Although three water outlets are shown in FIG. 1 (the spout, overhead shower head and wall mounted shower head), other numbers may be provided. For example, the shower system 1 may have only a single water outlet (e.g. a single shower head or spout) or may have three or more water outlets (e.g. additional mid-level shower heads). The present application relates to other types of ablutionary device which may, for example, be a tap (e.g. faucet) provided for a sink, wash basin, or other similar purpose. In yet other embodiments, each ablutionary device may be a mixture of both taps and shower heads. In some embodiments, the bath tub and shower may be combined (e.g. so that the shower is an over-bath shower).

FIG. 1 further shows a control system 100 that provides a controlled supply of water to the various water outlets of the shower system and bath tub. The control system may therefore be termed a control and supply system. In the embodiment shown in FIG. 1, the control system 100 provides a controlled water supply to two separate ablutionary devices. In other embodiments, any other number of ablutionary devices may be supplied and controlled, e.g. only one or three or more. For example, the control system may be connected to only a shower system or only a spout.

The supply of water is blended from a hot and cold water supply to give the desired water temperature. The control system 100 generally comprises a mixer valve unit 102, a user interface 104, and a remote on/off control 106. The mixer valve unit 102 receives a supply of cold water via a cold water conduit 108 coupled to the plumbing system of the building in which the shower system 1 is located. The cold water conduit provides a suitable supply of cold water. In some embodiments, the cold water supply is provided from a mains cold water supply or may instead be provided from a water tank such as a header tank (not shown in the figures). The mixer valve unit 102 also receives a supply of hot water via a hot water conduit 110 coupled to the plumbing system. The hot water conduit provides a supply of water that has been heated by a water heater 112 provided as part of the plumbing system. The water heater 112 may be an instantaneous water heater (such as a combi-boiler) or a storage water heater. Any other suitable water heater may be used. The mixer valve unit 102 supplies thee output conduits 114a, 114b, 114c with a blended water stream produced by mixing the cold and hot water supplies as will be described in more detail later. The output conduits 114a, 114b, 114c are fluidly coupled to the water outlets 2, 3, 6 of the ablutionary devices 1, 6. The mixer valve unit 102 may have any suitable number of water outlets so that a variety of different forms of ablutionary device (having various numbers of water outlets as described above) can be supplied. In some embodiments, the mixer valve unit may have more water outputs than necessary for the ablutionary device or devices being supplied. Any such redundant outlets may be capped-off if not required.

The user interface 104 is mounted within the shower enclosure 4, and is arranged to display information to the user and receive user input to control the shower system. The remote on/off control 106 is located outside of the shower enclosure to allow the user to turn the shower on and off before entering the enclosure 4. In other embodiments, a separate remote on/off control 106 may not be provided, and the shower turned on and off from the user interface 104. A separate user interface may be provided on the bath spout 6 (not visible in the Figures) to allow the flow of water from the spout to be controlled.

The control system 100 may further include, or may be adapted to communicate with, a portable user device 116 that may be used to remotely control the shower system. The portable user device 116 may be a dedicated device, or may take the form of a smart phone or the like on which a suitable application can be installed to interface with the control system 100. The portable user device 116 is in wireless communication with the mixer valve unit 102 via any suitable wireless connection such as Bluetooth or via a WiFi network. In the embodiment shown in FIG. 1, the parts of the control system 100 remote from the mixer valve unit 102 have a wired connection to it. In other embodiments, a wired or wireless connection can be used between any separate parts of the control system 100. For example, the user interface 104 and remote on/off control 106 may be wirelessly connected.

The mixer valve unit 102 may be located within a loft or floor space generally above the shower system. In other embodiments, the mixer valve unit 102 may be located in any other suitable location, such as underneath the bath or in a cupboard.

Figure 2:
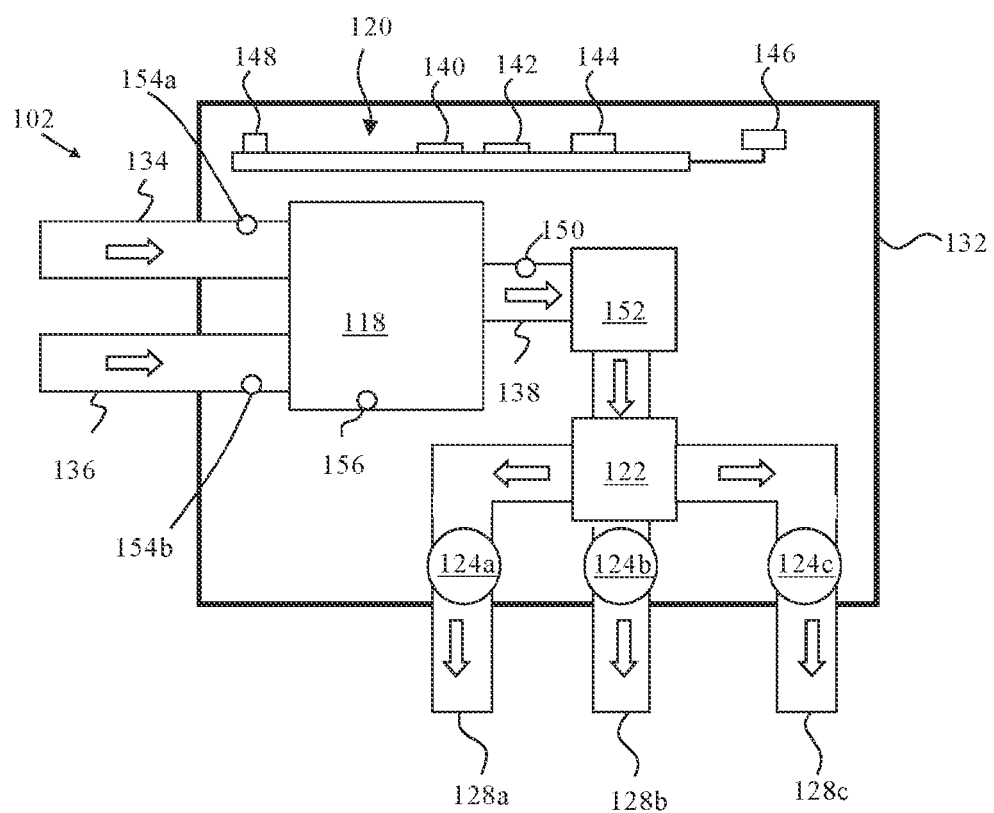
FIG. 2 shows a close-up schematic view of a mixer valve unit forming part of the control system shown in FIG. 1.

Referring now to FIG. 2, the mixer valve unit 102 is shown in more detail. The mixer valve unit 102 generally comprises: a mixer valve 118; a controller 120; a pump 122; first, second and third flow shut-off valves 124a, 124b, 124c; and first, second and third water outlets 128a, 128b, 128c. These components are mounted within a housing 132. Water flow through the mixer valve unit 102 is illustrated by the arrows in FIG. 2. The water carrying conduits, and the path taken by them, shown in FIG. 2 is a schematic example only to illustrate the general flow of water through the mixer valve unit 102. The water carrying conduits may have any suitable size and shape as required to allow for adequate water flow and mounting within the housing 132.

In the presently described embodiment, the mixer valve comprises first and second water inlets 134, 136, each of which is arranged to receive a supply of hot or cold water. Either one the inlets 134, 136 may be coupled to a hot or cold water supply, with the other inlet being coupled to the other of the hot and cold water supplies. In the presently described embodiment, the first water inlet 134 is coupled to the hot water conduit 110 and is referred to as the hot water inlet. The second water inlet 136 is coupled to the cold water conduit 108 and is referred to as the cold water inlet.

The mixer valve further comprises an outlet 138 that is configured to output cold water, hot water or a mixture thereof as an output stream for suppling water to the ablutionary devices 1,6 downstream of the mixer valve 118. The mixer valve 118 comprises one or more valves members that are movable to vary the rate of water flow between the hot and cold inlets and the outlet to control the blended stream. An example of a mixer valve 118 suitable for use in the mixer valve unit 102 will be described in more detail later.

The blended stream produced by the mixer valve 118 flows through the mixer valve outlet 138 (via a flow rate sensor as will be described later) to the pump 122. The pump 122 is also arranged to separate the blended stream into separate output flows. Each of these separate flows is used to supply each of the water outlets provided by the ablutionary device(s) (e.g. the wall mounted and overhead shower heads 2, 3 and bath spout 6). Although three separate output flows are produced by the pump in FIG. 2, any suitable number of outputs may be provided by splitting the blended stream into a suitable number of separate flows. If only one output from the mixer valve unit 102 is required the pump has a single input and output.

The separate output flows from the pump 122 flow through the first, second and third shut-off valves 124a, 124b, and 124c respectively. The shut-off valves are each moveable between a closed and open state to provide independent control of water flowing to each water outlet of the ablutionary device(s). This may allow the user to choose which water outlets they wish to use, and independently control the flow rate through each one in a range between the maximum flow provided by the mixer valve 118 and zero flow. The shut-off valves may be solenoid valves. Other types of shut-off valves may however be used. Each output of the mixer valve unit may be provided with a respective shut-off valve. In yet other embodiments, the shut-off valves may not be provided.

The shut-off valves 124a, 124b, 124c are fluidly coupled to respective first, second and third water outlets 128a, 128b, 128c. The first and second outlets 128a, 128b are fluidly coupled to the output conduits 114a, 114b to supply the water outlets of the shower system as shown in FIG. 1, and the third outlet 128c is fluidly coupled to the third output conduit 114c to supply the spout 6.

The pump 122 is arranged to increase the pressure of output flow from the mixer valve 118. The pump 122 may be provided where the control system 100 is to be supplied with a low pressure hot and/cold water supply (e.g. water from a cold/hot water storage tank, rather than a mains supply). The pump 122 is located downstream of a flow rate sensor (as discussed below) and before the shut off valves 124a, 124b, 124c. In other embodiments, a pump may be provided at any suitable point within the control and supply system to increase pressure if required. In yet other embodiments, the pump is absent. Such an embodiment is suitable for use where the supply pressure is adequate without it (e.g. where mains water pressure is provided, rather than water from a hot or cold water storage tank). Where the pump is not provided it may be replaced by a pipework manifold connecting the single output stream from the mixing valve to each of the outlets 128a, 128b, 128c via the shut-off valves.

The controller 120 is arranged to control operation of the various components of the control system 100. The controller 120 is in operative communication with the mixer valve 118, shut-off valves 124a, 124b, 124c, user interface 104, remote on/off control 106 and portable user device 116 by suitable wired or wireless connections. The controller 120 comprises one or more processors 140 and a memory 142 arranged to store computer readable instructions that may be carried out by the processor 140 in order to perform any of functions of the controller described herein. The controller further comprises a wireless communication module in the form of a Bluetooth module 144 and a WiFi module 146 arranged to allow wireless communication between the controller 120 and remotely located parts of the control system. The wireless communication module is further arranged to provide communication over the interne via a wireless local area network (Wi-Fi network), cellular network or any other suitable wireless network. The WiFi module may be a separate module connected to a main PCBA of the controller 120 by a wired connection as shown in FIG. 2. The WiFi module is mounted within the housing 132 in the described embodiment, but may be located remotely from the housing 132 in other embodiments. In yet other embodiments, the WiFi module 146 is located on the main PCBA of the controller.

The controller 120 further comprises a wired connection point 148 to which wired connections to other components of the mixer valve unit or control system 100 may be made. In the presently described embodiment only a single wired connection point 148 is shown. There may however be any suitable number (e.g. three) so that there are one or more wired connection points.

In the embodiment illustrated in FIG. 2, the processor 140 and memory 142 form a microcontroller (MCU) configured to carry out any of the functions of the controller described herein. In other embodiments, the controller may take different forms. The controller may comprise any combination of hardware and software that operates to control and process information and carry out programmed instructions. The controller may comprise any suitable processing circuitry including microprocessors, programmable logic devices, application specific integrated circuits (ASIC), application specific instruction set processors (ASIP) or the like. The controller 120 may be any device suitable for controlling the operations of the control system according to the functions defined herein (or additional functions) by processing information (e.g. information received from sensors, stored in local memory or received from an external source) and outputting instructions to components of the control system (e.g. the mixer valve and shut-off valves accordingly). In some embodiments, the controller 120 may be formed from distributed components, some or all of which may be located outside of the mixer valve unit 102. For example, the controller 120 may be located remotely from the housing 132, and may have a suitable wired or wireless connection with the components within the housing. In the described embodiment a single controller is provided to control a single mixer valve unit 102 in which a single mixer valve is included to provide blended water to water outlets of any number of ablutionary devices. In other embodiments, the controller may be arranged to control multiple mixer valve units 102, for example each having a separate mixer valve 118 and receiving separate hot and cold water supplies. For example, the controller 120 shown in FIG. 2 may control another mixer valve unit that is similar to that shown in FIG. 2, but without needing a second controller.

The control system further comprises one or more sensors that are arranged provide measurements of various operating parameters to the controller 120. Although not shown in FIG. 2, the sensors are operably coupled, either wired or wirelessly, to the controller 120 to send signals thereto.

The control system comprises output stream sensors arranged to generate output stream signals indicative of various water properties of the blended output stream of the mixer valve 118. In the embodiment illustrated in FIG. 2, the output stream sensors include an output temperature sensor 150 and output flow rate sensor 152. In other embodiments an output pressure sensor (not shown in the figures) may also be provided. These sensors are positioned to measure the properties of the water flow at any position downstream of the mixer valve 118 (e.g. downstream of the point where the blended stream is produced within the mixer valve, which may include within the mixer valve itself e.g. downstream of the valve member(s) controlling flow through the valve). They may be located within the mixer valve unit 102 as shown in FIG. 2. They may, for example, be between the mixer valve 118 and the pump 122 or manifold pipe work at which the output stream is divided. They may however be at any suitable position within the mixer valve unit. In other embodiments, they may be provided further downstream from the mixer valve unit.

The control system further comprises a first temperature sensor 154*a* arranged to generate a temperature signal indicative of the temperature of water flowing through or being supplied to the first water inlet 134 of the mixer valve. The first temperature sensor 154*a* may be located adjacent to the respective water inlet aperture of the mixer valve, or may be located further downstream at any point before the water flows are mixed within the mixer valve (it may therefore be within the mixer valve itself). The first temperature sensor may be located within the mixer valve unit 102 as shown in FIG. 2. The first temperature sensor may alternatively be located further upstream, and may be upstream of the mixer valve unit 102.

The control system further comprises a second temperature sensor 154*b* arranged to generate a temperature signal indicative of the temperature of water flowing through or being supplied to the second water inlet 136 of the mixer valve 118. The second temperature sensor 154*b* may be located adjacent to the respective water inlet aperture of the mixer valve, or may be located further downstream at any point before the water flows are mixed within the mixer valve (it may therefore be within the mixer valve itself). The second temperature sensor 145*b* may be located within the mixer valve unit 102 as shown in FIG. 2. The second temperature sensor may alternatively be located further upstream, and may be upstream of the mixer valve unit 102.

In the described embodiment, both a first and second temperature sensor are provided to measure temperature signals indicative of the temperature of the hot water supply or the cold water supply to the mixer valve 118. The first or second temperature sensors may measure either a hot water supply temperature signal or cold water supply temperatures signal, depending on which of the first and second inlet 134, 136 is being used to carry hot and cold water. In the described embodiment, the first temperature sensor 154*a* is a hot inlet temperature sensor measuring a hot temperature signal, and the second temperature sensor 154*b* is a cold inlet temperature sensor measuring a cold temperature signal. The user may select which inlet is which via a suitable user input once the system is connected.

In other embodiments, only one of the temperature sensors may be provided. In such an embodiment, the first and second inlets 134, 136 are configured to receive only one of a hot or cold water supply (e.g. they are not interchangeable).

In the described embodiment, the mixer valve comprises a valve position sensor 156 arranged to measure an actual valve position signal indicative of the actual position of the valve member or members within the mixer valve 118. The position of the valve members may be measured relative to the valve seat with which they are associated to provide feedback as to how much hot or cold water is being allowed to flow through the mixer valve 118. The valve position sensor 156 may be an encoder (e.g. a rotatory encoder) which may be any suitable type of inductive, magnetic, Hall Effect or resistive sensor. In other embodiments, a target position of the valve members may be relied on rather than a measured actual valve member position. In such an embodiment the valve position sensor 156 is not required and so is absent.

Any of the temperature sensors described herein may comprise a thermistor. Other types of temperature sensor may however be used such as a thermocouple, semiconductor sensor, infrared sensor or any other suitable sensor.

Any of the flow rate sensors described herein may comprise a flow turbine, ultrasonic sensor, pressure differential sensor or any other suitable type of flow rate sensor.

The position of the sensors shown in FIG. 2 is for illustration purposes only. The sensors may be located at any suitable position in order to provide the measurement of the desired properties of water flowing through the control system, or of the control system itself. Any of the sensors described herein are configured to produce a signal that is received by the controller and processed in order to carry out any of the functions described herein. The signals received by the processor may be converted to other formats for processing or storage by the processor.

The number and type of sensors provided in the control system is chosen according to the required functionality of the controller. In some embodiments, any one or more of the sensors shown in FIG. 2 may be absent if they are not required for certain functionality, e.g. if they are not required for the generation of a diagnostic signal according to any functions of the controller described herein.

The controller is configured to control the mixer valve 118 according to one or more target output water properties. By water properties we mean properties of water including its temperature, flow rate or pressure. The target output water properties are set by the user via the user interface 104 or via the portable remove device 116 using a suitable application running on that device, or may be defined by a shower program stored in the memory 142 of the controller. The controller is arranged to control the mixer valve in response to measurements from the output stream sensors so as to vary the flow of water through the mixer valve (e.g. through each flow control device with the mixer valve) to reach or maintain the desired target output water properties.

Figures 3, 4:
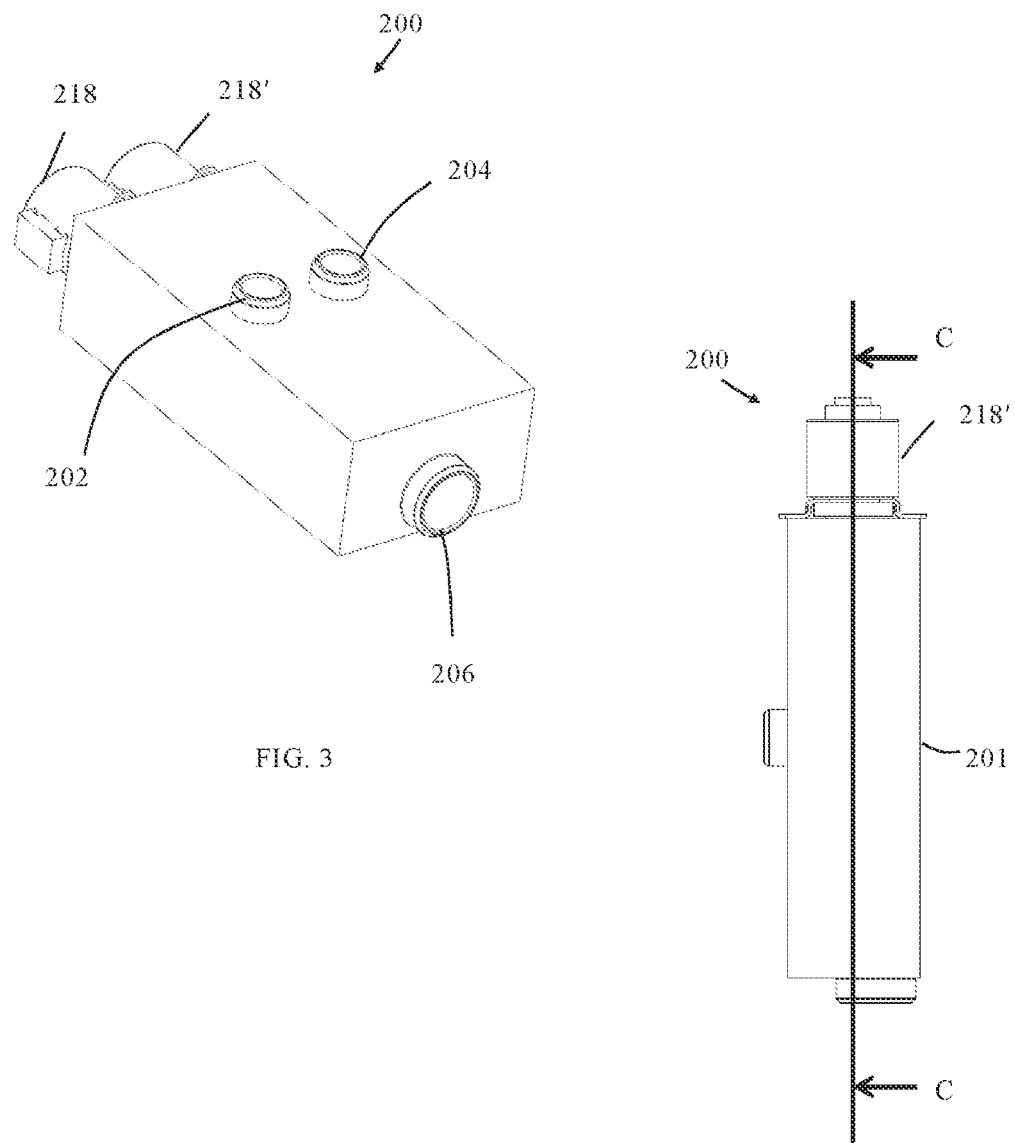
FIGS. 3 and 4 show a perspective and a side view of a mixer valve forming part of the mixer valve unit of FIG. 2.
Figure 5:
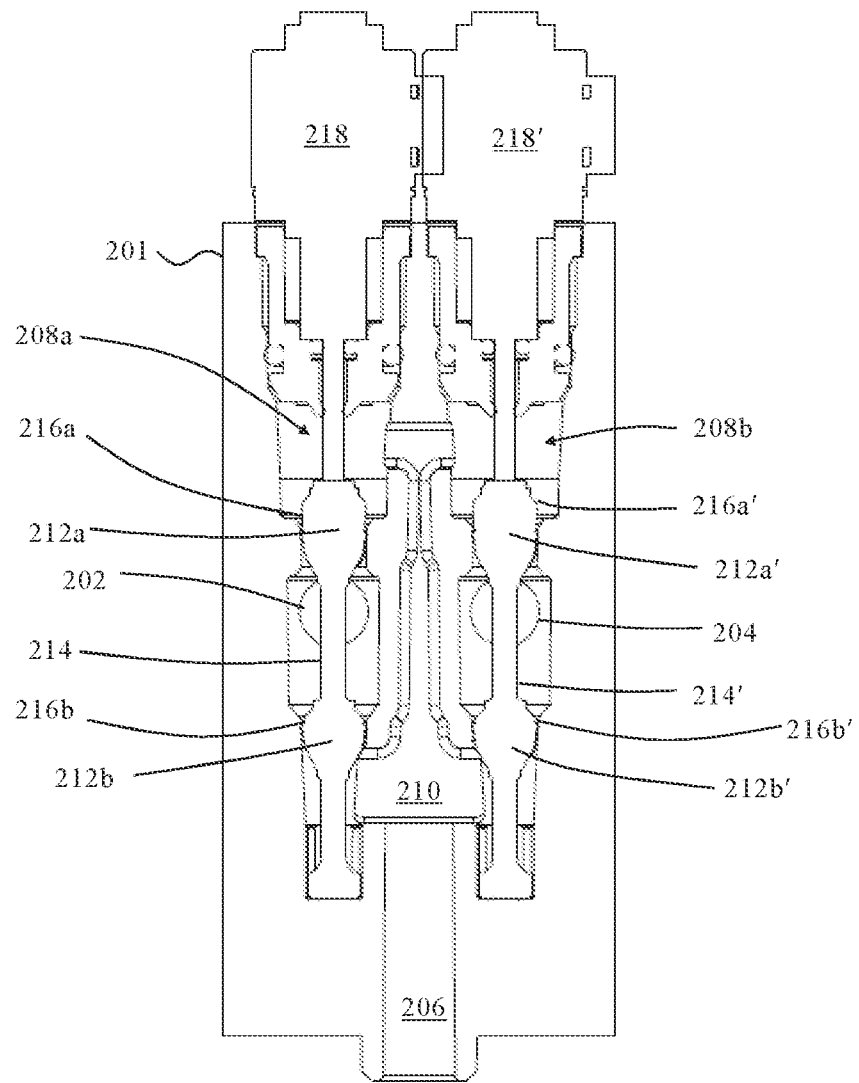
FIG. 5 shows a cross section through line CC marked in FIG. 4.
Figure 6:
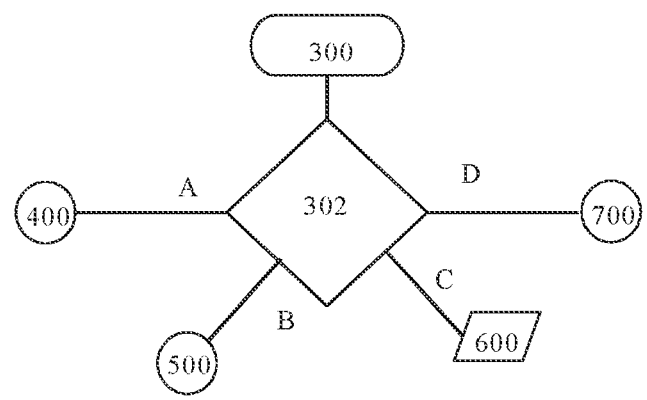
FIGS. 6 to 9 show a flow chart illustrating an extended diagnostic routine performed by a controller of the control system.

Referring now to FIGS. 3 to 5, an example of a mixer valve 200 suitable for use in the mixer valve unit 102 is shown in more detail. This is to be understood as only one example with alternative mixing valves that provide the desired controlled blending of hot and cold flows being apparent to the skilled person. The mixer valve 200 comprises a housing 201 having an aperture 202 forming a first water inlet and an aperture 204 forming a second water inlet. The housing 201 further comprises an aperture 206 to form an outlet.

The housing 201 houses a first flow control valve 208a and a second flow control valve 208b. The first flow control valve 206 is arranged to control the flow of water from the first inlet 202 to a mixing chamber 210. The second flow control valve 208 is arranged to control the flow of water from the second inlet 204 to the mixing chamber 210. From the mixing chamber 210 water flows to the outlet 206. The first and second flow control valves may control the flow of hot or cold water, depending on which if the first and second water inlets 134, 136 is connected to the hot or cold water supply.

As can be seen illustrated in FIG. 5, the first flow control valve 208a comprises a first valve member 212a' and a second valve member 212b each mounted to a shaft 214. The valve members are arranged to seal against associated valve seats 216a, 216b. The shaft 214 is movable via an actuator 218. The second flow control valve 208b correspondingly comprises a first valve member 212a' and second valve member 212b' with associated valve seats 216a', 216b'. The valves members of the second flow control valve are mounted to a shaft 214' moved by an actuator 218'. The valve member controlling the flow of hot water is referred to herein as a hot valve member, and the valve member controlling the flow of cold water is referred to as a cold valve member. In some embodiments, only one valve member is provided for each of the first and second flow control valves. These may be referred to as first and second valve members elsewhere herein.

The actuators 218, 218' are adapted to control the linear position of the shafts 214, 214' and thus the position of the first and second valve members with respect to the valve seats. The actuators 218, 218' may each comprise a stepper motor coupled with a lead screw arranged to move the associated shaft 214, 214' linearly in an axial direction. Any suitable actuator for controlling linear motion of the shaft may be employed in place of the stepper motor including, but not limited to, linear actuators. The controller 120 is in communication with the actuators 118, 118' (e.g. via a wired connection) so that the flow of water through the valve can be controlled as described above. The controller may also be in communication with the valve member position sensor where provided.

The mixer valve shown in FIGS. 3, 4 and 5 is only one such example. It may, for example, be a mixer valve as described in International Patent Application No. PCT/IB2013/001646 (WO2013/190381) or PCT/GB2018/053122 (WO2019/092401), which are hereby incorporated by reference. In other embodiments, the mixer valve may comprise any suitable number of cooperating valve members and valve seats in order to control the flow of hot and cold water into a mixing chamber.

In any of the embodiments described herein the sensors provided in the mixer valve unit may instead be located remotely from the mixer valve unit whilst still being in communication with the controller 120. For example, the first and second temperature sensors could be provided further upstream, for example in the water supply conduits 108, 110 rather than being part of the mixer valve unit itself. Similarly the outlet temperature sensor could be located downstream of the mixer valve unit.

In some embodiments, the a user interface 104, and a remote on/off control 106 shown in FIG. 1 may not be provided as part of the control system 100 described or claimed herein. In such embodiments, user interaction may be provided only with the mobile device 116 or other form of wired or wireless interface. The control system described or claimed herein may therefore be the mixer valve unit 102 (including any internal or connected remotely located sensors).

Diagnostic Signal Generation

The controller is further arranged to obtain one or more operating signals that are related to operating parameters of the control system. Based on the obtained operating signal or signals, the controller is configured to generate a diagnostic signal. The diagnostic signal indicates a failure mode causing the desired output water properties not being reached. The controller determines the type of failure mode to be indicated based on the information provided by the operating signals, i.e. information on the water flowing through the control system and/or how the control system is controlling the flow.

By generating such a diagnostic signal, the controller can provide an indication that a target water property, such as a desired temperature or pressure, is not being reached because of a problem with the water supply (e.g. a problem with the temperature, flow rate or pressure). The diagnostic signal therefore provides an indication that a problem with the output water flow perceived by the user is caused by the water supply, or lack thereof, rather than a problem with the shower system itself. This can make diagnosing the problem easier, and can avoid the need to perform unnecessary servicing of the shower system/controller when it is not at fault.

The operating signals obtained by the controller can take a number of different forms according to different types of operating parameters. The operating parameters generally relate to information on a state of operation of the control system and/or the water flowing through it. The operating parameters may reflect the current operation of the mixer valve 118, or may be related to water flow properties or parameters of the water flowing to or supplied from the mixer valve 118. The operating signal(s) may include a sensor signal indicative of water properties measured at respective points within the control system. Such sensor signals may be measured by the sensors provided in the control system described herein.

Diagnostic Signal Based at Least in Part on Hot Water Supply Temperature

The diagnostic signal determination may be based at least in part on the hot water supply temperature. The operating signal used by the controller 120 to generate the diagnostic signal may be provided by the first or second temperature sensor measuring the temperature of hot water (i.e. a hot water temperature signal) being supplied to or flowing through the corresponding inlet of the mixing valve 118.

The controller 120 therefore may be arranged to determine if a desired temperature (or pressure, or flowrate) of water being provided by the shower system is not being provided because of a lack of hot water input temperature. In the embodiment shown in FIG. 2, the first temperature sensor 154a is used to provide information to the controller on which the diagnostic signal is based as it is measuring the temperature of hot water supply. The controller is configured to receive the hot water temperature signal from the first temperature sensor 154. The hot water temperature signal is then compared by the controller to a threshold temperature value. In the present embodiment, the comparison is made to the target water output temperature used to control the mixer valve in order to generate the diagnostic signal. The diagnostic signal may be generated by the controller 120 if the comparison indicates that the temperature of hot water being supplied not greater than the target water output temperature by a threshold amount or proportion. The diagnostic signal may then be generated to indicate an 'insufficient hot water supply temperature' failure mode. For example, if the target output temperature desired by the user is 40° C. the diagnostic signal may be generated if the hot inlet temperature is less than 105% of this value (i.e. less than 42° C.) or less than a preset number of degrees above this value. The comparison may be made to the threshold in other ways. For example, it may be made to a predefined temperature threshold, rather than a proportion of the target water temperature.

Additionally or alternatively, the diagnostic signal may be generated by the controller 120 comparing the hot water temperature signal to a maximum system limit. If the comparison indicates that the temperature of water being supplied to the mixer valve is greater than the maximum system limit, the diagnostic signal is generated by the controller to indicate an 'excess hot water supply' failure mode. For example, the maximum system limit threshold may be set at a threshold such as 65° C. Above this temperature the valve unit may have difficulty controlling the output stream, or the water temperature may be damaging to internal components of the mixer valve unit. In other embodiments, a greater maximum system limit may be set, for example 85° C. A higher maximum system limit may be set when the comparison is made over a predetermined time duration (as described in more detail below).

Diagnostic Signal Based at Least in Part on Cold Water Supply Temperature

In the described embodiment, the diagnostic signal determination is also based at least in part on the cold water supply temperature. The controller may be arranged to receive a cold water temperature signal from the temperature sensor measuring the temperature of the cold water supply provided to the mixer valve unit (i.e. the second temperature sensor in the present embodiment). The controller 120 is configured to compare the cold water temperature signal and the target water output temperature in order to generate the diagnostic signal. If the comparison indicates that the temperature of water in the cold water inlet is greater than a threshold amount below the target water output temperature the diagnostic signal is generated to indicate an 'excess cold water supply temperature' failure mode. In other words, the cold water temperature should be at least a threshold amount below the output blend temperature (e.g. at least two degrees less than the output blend temperature). Similarly to the hot water comparison, the cold inlet temperature signal may be compared to a threshold related to a proportion of the target output temperature, or a predefined temperature below it.

The controller may be further arranged to compare the cold temperature signal and a minimum system limit in order to generate the diagnostic signal. If the comparison indicates that the temperature of water being supplied to the mixer valve is below the minimum system limit, the diagnostic signal is generated to indicate a cold water temperature supply too low failure mode. This indicates that the cold water temperature is lower than that which can be accommodated by the system and still allow the desired output water to be provided.

The controller 120 is further configured to generate a diagnostic signal based on the result of the hot water supply temperature comparison and the cold water supply temperature comparison described above when done in combination. The controller 120 is configured to generate a diagnostic signal to indicate a that the cold and/or hot water is within a suitable range, but a potential hot and/or cold water supply low pressure or restricted or blocked first inlet, second inlet, and/or outlet failure mode is present. This diagnostic signal is generated if: i) the comparison between the cold temperature signal and the target water output temperature and/or minimum system limit indicates that the temperature of cold water being supplied to the mixer valve is respectively at least a threshold amount below the target water output temperature and/or is below the minimum system limit; and ii) the comparison between the hot temperature signal and the target water output temperature or maximum system limit indicates that the temperature of hot water being supplied to the mixing valve is greater than a threshold amount above the target water output temperature and/or less than the maximum system limit. In this case, the controller determines that the temperature of water meets the required conditions to reach the target output water temperature, and the fault must instead be related to a low water pressure or restricted/blocked supply/outlet problem.

Diagnostic Signal Based at Least in Part on Output Stream Flow Rate

The controller 120 is further configured to generate the diagnostic signal at least in part based on the flow rate of the output stream downstream of the mixer valve 118. This can allow the controller to determine if one or both of the hot and cold water supply are blocked or has been switched off. To do this, the controller 120 is arranged to receive the output stream flow rate signal from the output stream flow rate sensor 152. In order to generate the diagnostic signal, the controller 120 is configured to compare the output stream flow rate signal to a threshold value. If the comparison indicates that the output stream flow rate is less than the threshold value, the diagnostic signal is generated to indicate a 'blocked hot and/or cold water supply or blocked or restricted outlet' failure mode. The threshold value may be zero flow, or substantially zero flow. If the controller 120 determines that no water flow is present downstream of the mixer valve 118, despite the mixer valve being controlled to attempt to reach the desired output water flow (e.g. at least one of the control valves in the mixer valve is open), a blocked hot and/or cold supply can be detected. The controller 120 can further determine which water supply is blocked by further basing the diagnostic signal on the valve member position determination as discussed below. By a 'blocked' water supply or outlet we mean that the flow is blocked and little or no water is able to flow. By 'restricted' we mean that water flow is reduced from the expected, but is not necessary completely blocked.

Diagnostic Signal Based at Least in Part on Target or Actual Valve Member Position Comparison The controller 120 is further configured to base the diagnostic signal on an operating parameter of the control system itself in addition or alternatively to a property of water flowing through the control system such as water temperatures and flow rates During normal operation of the shower system, the controller is arranged to adjust the position of the valve members provided in the mixer valve to maintain a desired outlet temperature and flow. In some embodiments, the operating signal on which the diagnostic signal is based is a target or an actual position of the valve member or members provided in the mixer valve.

In order to control the output blended stream, the controller 120 is configured to generate a target position used to set the position of each of the valve members. The target position is based on a comparison between the target water output property or properties (e.g. set by the user or required by a shower program) and the output stream signal measured by the output stream sensor(s). The controller 120 is configured to monitor the generated target position signal by performing a comparison to a threshold value. The threshold value may be pre-defined for the specific mixer valve (e.g. set during installation), and may be stored and obtained from the memory of the controller 120. The diagnostic signal may be generated by the controller if the comparison indicates that the target valve position exceeds the threshold.

The one or more water properties of the output stream used to generate the diagnostic signal in this way may include any of a target temperature, target pressure or target flow rate of the output stream. The target water output properties then include corresponding temperature, pressure and/or flow rate values for the output stream. The output stream sensors may therefore include the output temperature sensor 150, the output flow rate sensor 152 and an output pressure sensor to provide suitable measurements as described above.

The threshold values to which the valve member positions are compared are a respective open or closed threshold. The open threshold corresponds to a wide opening of the respective valve member beyond a normal running limit, and the closed threshold corresponds to a closing of the valve member beyond a normal running limit. In order to generate the diagnostic signal, the controller is configured to compare the valve member target positions to the respective closed thresholds and open thresholds, and determine which one or both of the valve member positions is above or below the closed or open thresholds in order to determine the failure mode indicated by the diagnostic signal. This allows the controller 120 to determine which failure mode is to be indicated by the diagnostic signal.

The positioning of the valve members beyond the open or closed thresholds indicates that the valve cannot flow sufficient hot and/or cold water at a sufficient temperature to achieve the target water output temperature at the desired output flow rate. The closed and open thresholds define the lower and upper bounds of a normal operating range of motion of the valve member position relative to the valve seat. When the valve member signal exceeds the open threshold the valve is therefore opened to an extent greater than expected during normal operating conditions (the valve is therefore open greater than a maximum amount that would be expected during normal operation). When the valve member signal is below the closed threshold the valve is therefore closed to an amount greater than expected during normal operating conditions (i.e. the valve is not open at least the minimum amount that would be expected during normal operation). By using the positioning of the valve member(s) the controller may determine a number of different failure modes as follows:

If the hot water temperature is too low, the valve member controlling the hot water flow would normally be opened as wide as possible by the controller to try and reach the desired outlet flow temperature. In that case, the target valve position may exceed the open threshold indicating that a maximum value expected during normal operation has been exceeded. The controller is configured to determine that the position of the valve member controlling the hot water flow has exceeded the open threshold, and generate the diagnostic signal to indicate an 'insufficient hot water supply temperature' failure mode (e.g. hot water not hot enough).

If the hot water temperature is too low the valve member controlling the cold water flow may be closed (or nearly closed) by the controller to try and reach the desired output temperature. In that case, the target valve position may be below the closed threshold. The controller is configured to determine that the cold water flow controlling valve member position has exceeded the closed threshold, and generate the diagnostic signal to indicate a 'insufficient hot water supply temperature' failure mode (e.g. hot water not hot enough).

If the cold water temperature is too hot, the valve member controlling the cold water flow would normally be opened as wide as possible by the controller to try and reach the desired outlet flow temperature. In that case, the target valve position of the cold water controlling valve member may exceed the open threshold, indicating that a maximum value expected during normal operation has been exceeded. The controller is configured to determine that the cold water flow valve member position has exceeded the open threshold, and generate the diagnostic signal to indicate an 'excess cold water supply temperature' failure mode (e.g. cold water too hot).

If the hot water temperature is too hot the valve member controlling the hot water flow may be closed (or nearly closed) by the controller to try and reach the desired output temperature. In that case, the associated target valve member position may be less than the closed threshold. The controller is configured to determine that the hot water flow valve member position has exceeded the closed threshold, and generate the diagnostic signal to indicate an 'excess hot water supply temperature' failure mode (e.g. hot water too hot).

If it is determined by the controller that both the first and second valve member signals are less than the closed threshold an 'excess cold and hot pressure' failure mode diagnostic signal is generated. If both valve members are below the closed threshold during normal operation this indicates that the input water pressure is too high, and the valve members must be almost closed by the controller in order to control the output flow.

If it is determined by the controller that both of the first and second valve member signals exceed the open threshold a diagnostic signal indicating a 'hot and cold pressures too low, both the hot and cold is restricted or blocked, flow demand too high, or outlet blocked or restricted' failure mode is generated. If both valve members exceed the open threshold this indicates that the mixing valve is unable to allow adequate water to flow indicating there is a problem with a lack of pressure, blocked or restricted inlets or outlet, or a too greater demand of outlet flow is required.

By basing the diagnostic signal generation on valve member position it may be generated without the need for sensors to measure the inlet water temperature. Alternatively, this indirect measurement may be provided in combination with the sensor based measurement to provide a more reliable generation of the diagnostic signal (e.g. to avoid false generation of the diagnostic signal).

In some embodiments, the diagnostic signal may additionally or alternatively, be based on the measurement of the actual valve position provided by the valve position sensor 156. In this embodiment, the controller is configured to monitor the measured actual valve position signal by performing a comparison to a threshold value, and generate the diagnostic signal based on a similar threshold comparison described above.

The controller may additionally or alternatively base the determination of the type of failure mode on the valve member position determination in combination with the output flow rate measurement. The controller is configured to combine the valve member position comparison and the output stream flow rate signal comparison to determine which of the hot water supply inlet, cold water supply inlet or both are blocked, or if both the hot inlet and cold inlet pressure is insufficient, or both of the inlets are restricted.

The controller is configured to generate the following diagnostic signals based on a combination of the valve member position and output flow rate measurement:

i) if the valve members controlling the flow of both the cold and hot water each exceed their respective open condition, and the output flow rate signal comparison is negative (i.e. the flow rate signal is equal to or less than the respective threshold), the controller is configured to generate the diagnostic signal indicating a 'hot and cold water supply blocked or turned off or supply pressure too low' failure mode. If both valve members exceed the open threshold in an attempt to provide the desired output flow rate, yet little or no output flow is detected downstream of the mixer valve, the controller is able to determine that both of the water supplies are blocked, or have been switch off or disconnected.

ii) if the hot valve member exceeds the open threshold but the cold valve member exceeds neither threshold, the cold valve member exceeds the closed threshold but the hot valve member exceeds neither threshold, or the hot valve member exceeds the open threshold and the cold valve member exceeds the closed threshold, in combination with the flow rate signal comparison being negative, the controller is configured to generate the diagnostic signal indicating a 'hot water supply blocked or turned off' failure mode.

iii) if the hot valve member exceeds the closed threshold but the cold valve member exceed neither threshold, the cold valve member exceeds the open threshold but the hot valve member exceeds neither threshold, or the hot valve member exceeds the closed threshold and the cold valve member exceeds the open threshold, in combination with the flow rate signal comparison being negative, the controller is configured to generate the diagnostic signal indicating a 'cold water supply blocked or turned off, or cold supply pressure too low' failure mode.

The controller may additionally or alternatively base the diagnostic signal generation on a combination of the valve member position comparison and the (hot and cold) temperature signal comparisons to determine which of the hot water or cold water supply pressure is too high or too low, or which of the hot or cold water supply or outlet is restricted or blocked. This may be done when the hot and cold temperature signals are determined to be within normal operating conditions.

The controller is configured to generate the following diagnostic signals based on a combination of the valve member position and temperature signal comparisons: (i) if the hot valve member exceeds the open threshold but the cold valve member exceed neither threshold, the cold valve member exceeds the closed threshold but the hot valve member exceeds neither threshold, or the hot valve member exceeds the open threshold and the cold valve member exceeds the closed threshold, in combination with the hot and cold temperature comparisons defined above being positive (i.e. the hot and cold water temperature are within the required limits to reach the desired water output) the controller is configured to generate the diagnostic signal indicating a 'hot water supply low pressure' and/or 'cold water pressure too high', or 'restricted hot water supply' failure mode; and (ii) if the hot valve member exceeds the closed threshold but the cold valve member exceed neither threshold, the cold valve member exceeds the open threshold but the hot valve member exceeds neither threshold, or the hot valve member exceeds the closed threshold and the cold valve member exceeds the open threshold, in combination with the hot and cold temperature comparisons defined above being positive (i.e. the hot and cold water temperature are within the necessary limits) the controller is configured to generate the diagnostic signal indicating a 'hot water supply high pressure' and/or 'cold water pressure too low, or 'restricted cold water supply' failure mode.

When generating the diagnostic signal the controller may be configured to perform a time dependent comparison of the operating signal or signals against a respective threshold or value. For example, any of the comparison of a temperature signal(s), output flow rate or valve member position to a threshold value may be performed over a predefined time period. The diagnostic signal is generated accordingly if the threshold determination is positive/negative for the duration of the time period. The threshold value may be specific to the predefined time period. For example, a greater maximum system limit for the hot water supply may be used for a longer predefined comparison period.

Action in Response to Diagnostic Signal Generation

Once the diagnostic signal has been generated by any one or more of the methods defined herein the controller 120 may control the operation of the ablutionary device or devices to which it supplies water in response. In one embodiment, the controller 120 is configured to control the mixer valve 118 in response to the diagnostic signal. In this embodiment, the controller is configured to at least temporarily reduce the flow rate of hot and/or cold water flowing through the mixer valve 118 in response to the diagnostic signal indicating that the desired output water property cannot be achieved.

The controller may be arranged to change the one or more target output water properties by which the water output is being controlled in response to the diagnostic signal. For example, the temperature or flow rate set point may be reduced to at least temporarily reduce the demand for water flowing through the mixer valve.

This feedback to the control of the mixer valve may be advantageous where the hot water is provided by an instantaneous water heater such as a combi-boiler. By reducing the flow of hot water through the mixer valve the demand placed on the instantaneous water heater can be reduced. This may allow it adequate heating capacity to provide water at the suitable temperature by reducing the flow rate it must provide. After a predefined period of time the mixer valve may be allowed to operate normally again without any restriction. An example of where the temporary reduction may be useful is, during use of one of the ablutionary devices (e.g. the shower system), hot water is used elsewhere from the same heating system, e.g. a hot tap is turned on and the hot water needs to be shared for a short while between multiple water outlets.

The controller may be additionally or alternatively configured to close the mixer valve 118 and/or the flow shut off valves downstream of the mixer valve in response to the diagnostic signal. The flow may be shut-off (by closing the valve of the shut-off valves) if temporarily reducing the flow through the mixing valve does not result in a return towards desired output water stream properties.

In the embodiment illustrated in FIGS. 1 and 2 the controller 120 is further configured to send the diagnostic signal to the user interface 104 and/or the remote device 116 for display to the user and/or storage. An indication of the response carried out by the controller based on the diagnostic signal may also be sent and displayed to the user. This may inform the user that the water supply is not adequate and appropriate action is being taken by the controller (e.g. to reduce the flow or to shut-off the flow). The display of the diagnostic signal may indicate that there is a problem with the water supply that may require servicing of the water heater 112 or other appropriate action (such as filter cleaning, or removing a blockage in the system). The controller 120 is configured to send the diagnostic signal via the wireless communication module (e.g. via Bluetooth or WiFi network) or via a wired connection.

The controller 120 may be further arranged to send the diagnostic signal (and/or controller response information) to a remote location such as a servicing center via the interne. The diagnostic signal may be sent to a remote server system for suitable processing. This may allow the performance of the shower system to be monitored remotely by its manufacturer or a servicing company. This allows a third party such as the manufacturer/servicing company to determine that it is not the shower control system (or the shower) which is at fault, and that the inability to provide water at the desired temperature/flow rate/pressure is more likely caused by a problem with the water supply. Unnecessary repair or replacement of the control system (or shower) can be avoided, and the problem addressed by checking the hot water supply.

The diagnostic signal may also be stored in the memory 142 of the controller so that it can be accessed at a later date or form part of a performance log. This can be displayed to the user or communicated to the manufacturer/service company.

Extended Diagnostic Routine

By combining the various determinations of different diagnostic signal types based on different operating parameters of the control system the controller 120 may be configured to perform the extended diagnostic routine 300 illustrated by the flow chart spanning FIGS. 6, 7, 8 and 9. The extended diagnostic routine includes diagnostic signal generation steps based on valve member position, hot water supply temperature, cold water supply temperature, and mixer valve output stream flow rate. At each diagnostic generation step the diagnostic signal may be stored in memory, displayed to the user or transmitted to a remote location as described above. Any part of the extended diagnostic routine may be performed separately, and may be performed in connection with any other embodiment or functionality disclosed herein.

The extended diagnostic routine 300 comprises a step 302 of performing a comparison of the valve member positions to the open and closed thresholds to determine whether one or both of the hot and cold valve members exceed either of those thresholds. The controller may determine which of four different sets (A, B, C, or D) of valve member position conditions is present, those sets being:

A: i) the hot valve member exceeds the open threshold but the cold valve member exceed neither threshold, ii) the cold valve member exceeds the closed threshold but the hot valve member exceeds neither threshold, iii) the hot valve member position exceeds the open threshold and the cold valve member position is less than the closed threshold.

B: i) the hot valve member position exceeds the closed threshold but the cold valve member is within the normal operating range, ii) the cold valve member position exceeds the open threshold but the hot valve member position is within the normal operating range, iii) the hot valve member position is less than the closed threshold and the cold valve member exceeds the open threshold.

C: both hot and cold valve member positions are less than the closed threshold

D: both hot and cold valve members exceed the open threshold

Figure 7:
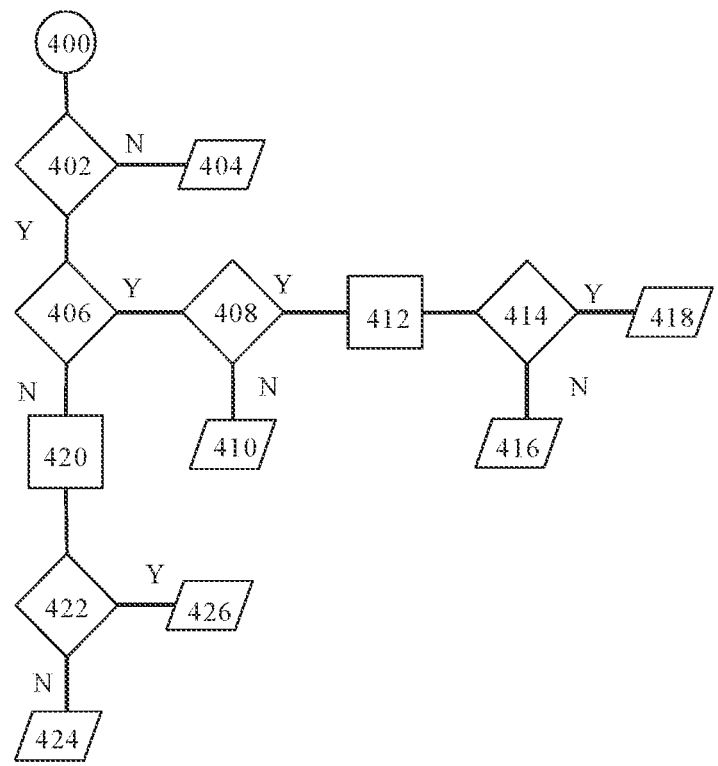

If condition A is determined by the controller, the diagnostic routine proceeds to the steps of subroutine 400 shown in FIG. 7. Subroutine 400 begins with a flow rate determination step 402 in which the controller is configured to compare the output stream flow rate signal against a threshold value as described above. If the comparison is negative i.e. the flow rate is less than the threshold, a diagnostic signal 404 indicating a 'hot water supply blocked or turned off' failure mode is generated. If the comparison is positive, i.e. the flow rate is greater than the threshold, the subroutine 400 proceeds to perform a hot water supply determination 406.

At step 406 a hot water supply determination is performed by comparing the hot supply temperature signal to the target water output temperature as described above. If the comparison is positive, i.e. the hot supply temperature signal is sufficiently greater than the target output temperature, the controller moves on to perform a cold water supply determination at step 408 of the subroutine. At step 408 a cold water supply determination is performed by comparing the cold supply temperature signal and the target water output temperature. If the comparison is negative, i.e. the cold supply temperature is not sufficiently above the minimum system limit, a 'too low cold water supply temperature' failure mode diagnostic signal is generated. If the comparison is positive, i.e. the cold supply temperature is sufficiently below the minimum system limit temperature, the controller moves on to step 412 of the subroutine.

At step 412, the controller reduces the rate of flow through the mixer valve, for example by reducing the target output flowrate. Following this the controller determines at step 414 if the hot and cold valve member signals return to being within normal operating range i.e. that neither the open or closed threshold is exceeded by either of the valve member signals. If the determination at step 414 is negative, i.e. that one or both of the valve member signals continue to exceed the open or closed threshold, a diagnostic signal is generated 416 indicating a pressure failure mode, specifically that the hot water supply pressure is too low and/or the cold water supply pressure is too high, or the hot water supply is restricted. The controller may then also shut down operation of the valve unit and generate a diagnostic signal indicating that a fault has occurred requiring immediate rectification. If the determination at step 414 is positive, i.e. that the valve member signals no longer exceed or are below the open or closed threshold respectively, the pressure failure mode diagnostic signal is again generated, indicating that the hot water supply pressure is too low and/or the cold water supply pressure is too high, or the hot water supply is restricted. In this case, the controller may allow continued operation of the valve unit and generate a diagnostic signal indicating that a fault has occurred requiring rectification as soon as possible.

Returning to step 406, if the comparison is negative, i.e. the hot supply temperature signal is not sufficiently greater than the target output temperature, the controller is configured at step 420 to reduce the rate of flow through the mixer valve, and e.g. by reducing the target output flowrate. Following this the controller determines at step 422 if the hot and cold valve member signals return to being within normal operating range. If the determination at step 422 is negative, i.e. that one or both of the valve member signals continue to exceed or are below the open or closed threshold respectively, a diagnostic signal is generated at 424 indicating a 'stored water depleted' failure mode diagnostic signal if the hot water supply is from a water storage tank. The controller may then also shut down operation of the valve unit. If the determination at step 420 is positive, i.e. that the valve member signals no longer exceed or are below the open or closed threshold respectively, a 'hot water heater cannot keep up with demand' failure mode diagnostic signal is generated 426. This indicates that, for the case of the hot water supply being provided by an instantaneous water heater, the demand for hot water cannot be met at the desired output flow rate. In this case, the controller may allow continued operation of the valve unit.

Figure 8:
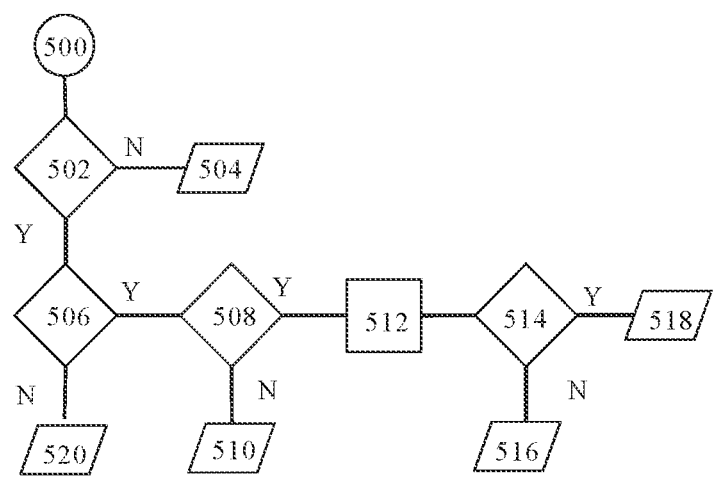

If condition B is determined by the controller, the diagnostic routine proceeds to the steps of subroutine 500 shown in FIG. 8. Subroutine 500 begins with a flow rate determination 502 in which the controller is configured to compare the output stream flow rate signal against a threshold value as described above. If the comparison is negative i.e. the flow rate is less than the threshold, a diagnostic signal 504 indicating a 'hot water supply blocked or turned off' failure mode is generated. If the comparison is positive, i.e. the flow rate is greater than the threshold, the subroutine 500 proceeds to perform a cold water supply determination 506.

At step 506 a cold water supply determination is performed by comparing the cold supply temperature signal to the target water output temperature as described above. If the comparison is positive, i.e. the cold supply temperature signal is sufficiently below the target output temperature, the controller moves on to perform a hot water supply determination at step 508 of the subroutine. At step 508 a hot water supply determination is performed by comparing the hot supply temperature signal and the maximum system limit. If the comparison is negative, i.e. the hot supply temperature is above the maximum system limit, a 'hot water temperature too hot' failure mode diagnostic signal is generated. If the comparison is positive, i.e. the hot supply temperature is below the maximum system limit, the controller moves on to step 512 of the subroutine.

At step 512, the controller reduces the rate of flow through the mixer valve, for example by reducing the target output flowrate. Following this the controller determines at step 514 if the hot and cold valve member signals return to being within normal operating limits. If the determination at step 514 is negative, i.e. that one or both of the valve member signals continue to exceed or be below the open or closed threshold respectively, a diagnostic signal is generated 516 indicating a pressure failure mode, specifically that the hot water supply pressure is too high and/or the cold water supply pressure is too low, or the cold water supply is restricted. The controller may then also shut down operation of the valve unit and generate a diagnostic signal indicating that a fault has occurred requiring immediate rectification. If the determination at step 514 is positive, i.e. that the valve member signals no longer exceed or are below the open or closed threshold respectively, the pressure failure mode diagnostic signal is again generated 518, indicating that the hot water supply pressure is too high and/or the cold water supply pressure is too low, or the cold water supply is restricted. In this case, the controller may allow continued operation of the valve unit (at the reduced flow rate set at step 512) and generate a diagnostic signal indicating that a fault has occurred requiring rectification as soon as possible.

Returning to step 506, if the comparison is negative, i.e. the cold supply temperature signal is not sufficiently below the target output temperature, the controller is configured at step 520 generate a diagnostic signal indicating a 'cold supply temperature too high' failure mode.

Returning to FIG. 6, if condition C is determined, the controller is configured to generate 600 a diagnostic signal indicating a 'hot and cold supply pressure too high' failure mode.

Figure 9:
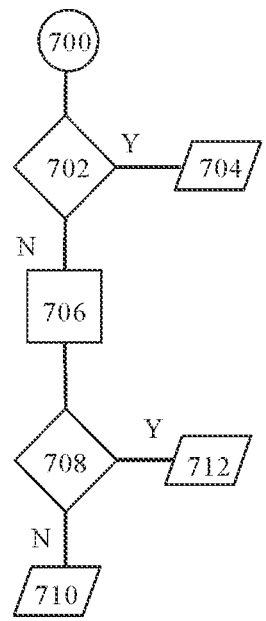

If condition D is determined, the controller is configured to perform the subroutine shown in FIG. 9. Subroutine 700 begins with a flow rate determination 702 in which the controller is configured to compare the output stream flow rate signal against a threshold value as described above. If the comparison is negative i.e. the flow rate is less than the threshold, a diagnostic signal 704 indicating a 'hot and cold water supply blocked or turned off' failure mode is generated. If the comparison is positive, i.e. the flow rate is greater than the threshold, the controller is configured to reduce 706 the rate of flow through the mixer valve. Following this the controller determines at step 708 if the hot and cold valve member signals return to being within normal operating range. If the determination at step 708 is negative, i.e. that both of the valve member signals continue to exceed the open threshold (i.e. condition D), a diagnostic signal is generated at 710 indicating a 'hot and cold water pressure too low or restricted' failure mode. The controller may then also shut down operation of the valve unit. The diagnostic signal further indicates that the fault should be rectified immediately. If the determination at step 708 is positive, i.e. that the valve member signals no longer exceed or are below the open or closed thresholds respectively, the 'hot and cold water pressure too low or restricted' failure mode diagnostic signal is again generated 712. In this case, the controller allows continued operation of the valve member (at the reduced flow rate set at step 706), and the diagnostic signal indicates that the fault should be rectified as soon as possible.

Figure 10:
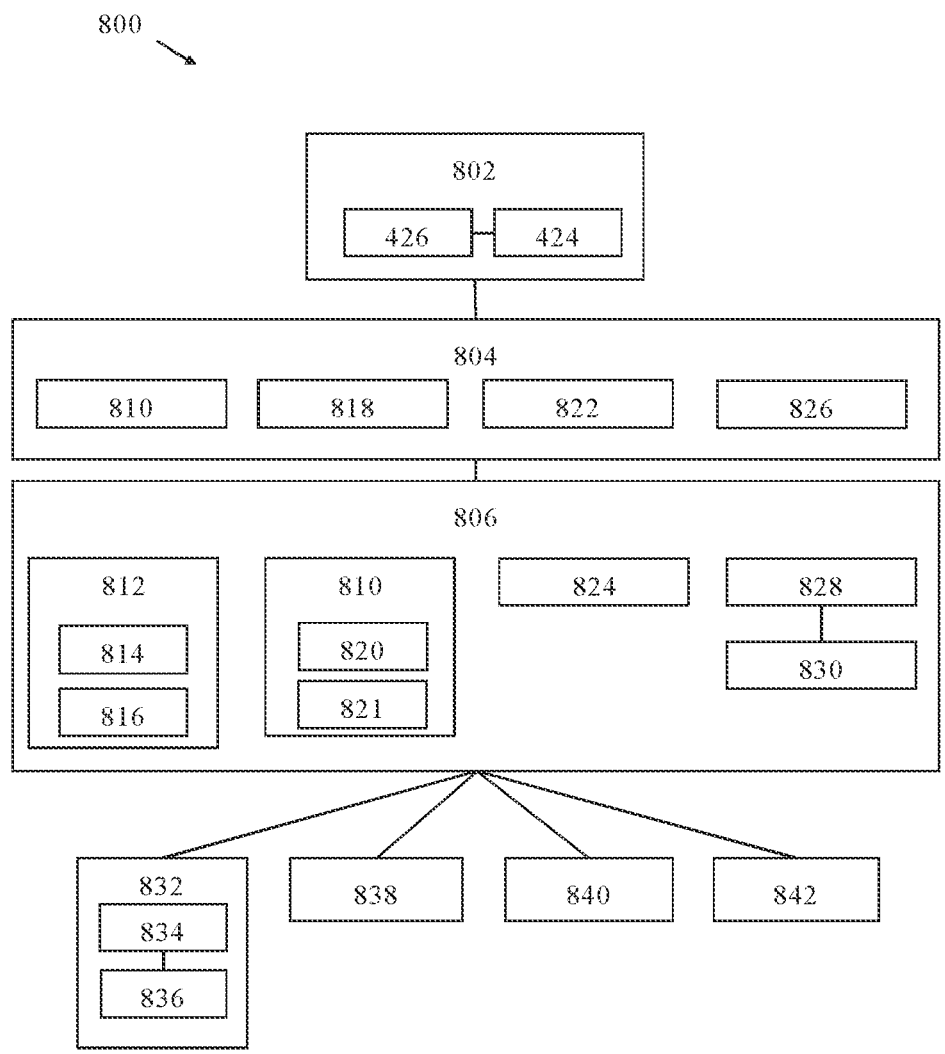
FIG. 10 shows a method performed by a control system according to an embodiment.

Referring to FIG. 10, a method 800 performed by a control system of an ablutionary device or devices is illustrated. The control system and ablutionary devices may be as defined in connection with any other embodiment described herein. As described above, the control system comprises a mixer valve having a first water inlet configured to receive a supply of one of hot or cold water, a second water inlet configured to receive a supply of the other of hot or cold water, and an outlet configured to output cold water, hot water or a mixture thereof as an output stream for suppling water to the ablutionary device downstream of the mixer valve. The method 800 may comprise steps to perform any of the functions of the control system 100 (e.g. functions of the controller 120) as defined elsewhere herein.

The method 800 comprises controlling 802 the mixer valve according to one or more target output properties. The mixer valve is controlled according to a target temperature, pressure and/or water pressure as already described by control of the mixer valve using respective target water output temperature, flow rate and pressure values.

The method further comprises obtaining 804 one or more operating signals, each related to an operating parameter of the control system.

Once the operating signals are obtained, the method 800 comprises generating 806 the diagnostic signal. The diagnostic signal may be generated using any of the methods described elsewhere herein. In the method shown in FIG. 10, the diagnostic signal is generated based on the hot water temperature signal, cold water temperature signal, mixer valve output flow rate signal and valve member positions, or combinations therefore, as described above.

In order to base the diagnostic signal generation on the hot water supply temperature the one or more operating signals include a hot temperature signal indicative of the temperature of water flowing through or being supplied to one of the first or second inlets. The hot water temperature signal may be provided by the first or second temperature sensors as described above. Obtaining 804 one or more operating signals comprises receiving 810 the hot water temperature signal. The diagnostic signal is generated 812 based at least partly on the hot water temperature signal as described elsewhere herein, Generating the diagnostic signal comprises comparing 814 the hot water temperature signal and a target water output temperature of the one or more target output water properties in order to generate the diagnostic signal. If the comparison indicates that the temperature of water being supplied to the mixer valve is not greater than a threshold amount above the target water output temperature the diagnostic signal is generated to indicate an insufficient hot water supply temperature failure mode.

Generating the diagnostic signal further comprises comparing 816 the hot water temperature signal to a maximum system limit. If the comparison 816 indicates that the temperature of water being supplied to the mixer valve is greater than the maximum system limit, the diagnostic signal is generated to indicate an excess hot water supply failure mode.

In order to base the diagnostic signal generation on the cold water supply temperature the one or more operating signals include a cold water temperature signal indicative of the temperature of cold water being supplied to the mixer valve. Obtaining 304 the one or more operating signals therefore further comprises receiving 818 the water cold temperature signal. The cold water temperature signal may be received from the first or second temperature sensors as described above. The diagnostic signal then generated based at least partly on the cold water temperature signal.

Generating 806 the diagnostic signal comprises comparing 820 the cold water temperature signal and the target water output temperature. If the comparison indicates is not at least a threshold amount below the target water output temperature the diagnostic signal is generated to indicate an excess cold water supply temperature failure mode. Generating 806 the diagnostic signal further comprises comparing 821 the cold temperature signal and a minimum system limit in order to generate the diagnostic signal. If the comparison indicates that the temperature of water being supplied to the mixer valve is below the minimum system limit, the diagnostic signal is generated to indicate a cold water temperature supply too low failure mode.

The diagnostic signal generation may be further based on a combination of the cold and hot water temperature determinations in order to generate a diagnostic signal to indicate a potential hot and/or cold water supply low pressure or restricted or blocked first inlet, second inlet, and/or outlet failure mode is present if the hot and cold water temperatures are found to be within suitable limits.

The method 800 further comprises obtaining 822 operating signals in the form of an output stream flow rate signal indicative of the rate of flow of the output stream of the mixer valve. The output stream flow rate signal is received from the output flow rate sensor as described above. Once the flow rate signal is obtained, generating 806 the diagnostic signal comprises comparing 824 the output stream flow rate signal to a threshold value. If the comparison indicates that the output stream flow rate is less than the threshold value, the diagnostic signal is generated to indicate a blocked or restricted hot and/or cold water supply, or blocked or restricted outlet failure mode as described elsewhere herein.

The method 800 further comprises obtaining 826 operating signals that include a target or actual position of the first and second valve members provided in the mixer valve. Generating 806 the diagnostic signal comprises comparing 828 the valve member target or actual position to a closed threshold and an open threshold. Following this the generating step 806 comprises determining 830 determine which one or both of the valve member positions is above or below the closed or open thresholds respectively in order to determine the failure mode indicated by the diagnostic signal as described above.

The valve member position comparison may be combined with the flow rate signal based determination 824, and the hot and cold temperature based determinations 812, 810 in order to determine the failure mode indicated by the diagnostic signal as described above.

While the method 800 illustrated in FIG. 10 includes steps 812, 810, 824 and 828 in which the generation of the diagnostic signal is based on the hot water temperature, cold water temperature, flow rate and valve member position in parallel, these steps can be done individually in any order as required. In some embodiments, the diagnostic signal generation step comprises performing the extended diagnostic routine described above. In yet other embodiments, any one or more of the steps 812, 810, 824 and 828 shown in FIG. 10 may be absent (along with the associated step of obtaining the corresponding operating signal 810, 818, 822, 826).

Referring again to FIG. 10, the method 800 further comprises controlling 832 the mixer valve in response to the diagnostic signal generated in step 806. Controlling 832 the mixer valve in response to the diagnostic signal comprises controlling 834 the mixer valve to at least temporarily reduce the flow rate of hot and/or cold water through the mixer valve in response to the diagnostic signal. The mixer valve may also be closed 836 in response to the diagnostic signal.

Other functions may be carried out using the diagnostic signal once it has been generated as described above. The method 800 may further comprise closing 838 the flow shut-off valve described above in response to the diagnostic signal. Steps 836 and/or 838 may be performed in response to a temporary reduction in flow not succeeding to remedy the insufficient flow of hot water.

In addition, or alternatively, to being used to provide further control of the control system, the diagnostic signal may be stored, displayed or transmitted as described above. The method 800 may further comprise sending 840 the diagnostic signal to the user interface and/or a remote device for display and/or storage. The diagnostic signal may also be sent to the manufacturer or Service Company to aid with advising the user on how to remedy problems with the shower. The diagnostic signal may be sent to a remote server system for suitable processing. The diagnostic signal can be sent via a wireless connection (e.g. Bluetooth or WiFi network) or via a wired connection as already described.

Finally, the method may comprise storing 842 the diagnostic signal in a local memory. This may allow the diagnostic signal to be used as part of a performance log, or accessed by the user or an engineer performing a service.

In some embodiments, the method 800 may comprise monitoring an actual valve position signal indicative of an actual position of the one or more valve members rather than a target position as described above. This may be done by obtaining a measurement of the valve position from a suitable sensor as already described and performing a comparison of the actual position to a threshold value. The diagnostic signal can then be generated based on the comparison in the same way as the comparison to the target valve position signal.

By combining the various determinations of different diagnostic signal types based on different operating parameters of the control system the method 800 may perform part or all of the extended diagnostic routine 300 illustrated by the flow chart spanning FIGS. 6, 7, 8 and 9 as described above.

Various modifications will be apparent to the skilled person without departing form the scope of the claims. The embodiments described above should be understood as exemplary only. Any feature of any of the aspects or embodiments of the disclosure may be employed separately or in combination with any other feature of the same or different aspect or embodiment of the disclosure and the disclosure includes any feature or combination of features disclosed herein.

What is claimed is:

1. A control system for one or more ablutionary devices, comprising:
   a mixer valve having a first inlet and a second inlet configured to receive a supply of hot and cold water, and an outlet configured to output cold water, hot water, or a mixture thereof as an output stream for supplying water to the one or more ablutionary devices downstream of the mixer valve, the mixer valve comprising first and second valve members arranged to control flow between the inlets and the outlet; and
   a controller in communication with the mixer valve, the controller configured to:
      control the mixer valve of one or more target output water properties, the controller configured to control the position of the valve members in order to control the output stream;
      obtain one or more operating signals each related to an operating parameter of the control system, wherein the one or more operating signals include a hot water temperature signal indicative of the temperature of hot water flowing through or being supplied to at least one of the first or second inlets, the one or more operating signals including a target or actual position of the first, second, or both of the valve members; and
      generate, based at least partly on the hot water temperature signal, a diagnostic signal that indicates an associated failure mode of the water supply if the mixer valve cannot be controlled to reach the one or more target water output properties, wherein generating the diagnostic signal comprises comparing the valve member target or actual position to a closed threshold and an open threshold, and determining which one or both of the valve member positions are below the closed threshold or exceeding the open threshold in order to determine the failure mode indicated by the diagnostic signal;
   wherein when the diagnostic signal is generated, the controller causes at least one of the following actions to occur:
      transmitting the diagnostic signal to at least one of a user interface and a remote device; and
      transmitting the diagnostic signal to a service company.

2. The control system of claim 1, wherein:
   the controller is configured to receive the hot water temperature signal; and
   the control system further comprises a temperature sensor arranged to generate the hot water temperature signal.

3. The control system of claim 2, wherein the controller is configured to compare the hot water temperature signal and a target water output temperature of the one or more target output water properties in order to generate the diagnostic signal, wherein if the comparison indicates that the temperature of hot water being supplied to the mixer valve is not greater than a threshold amount above the target water output temperature the diagnostic signal is generated to indicate an insufficient hot water supply temperature failure mode.

4. The control system of claim 2, wherein the controller is configured to compare the hot water temperature signal and a maximum system limit in order to generate the diagnostic signal, wherein if the comparison indicates that the temperature of water being supplied to the mixer valve is greater than the maximum system limit, the diagnostic signal is generated to indicate an excess hot water temperature supply failure mode.

5. The control system of claim 1, wherein:
   the one or more operating signals include a cold water temperature signal indicative of the temperature of cold water being supplied to the mixer valve; and
   the control system further comprises a temperature sensor arranged to generate the cold water temperature signal.

6. The control system of claim 5, wherein:
   the controller is configured to:
      receive the cold water temperature signal; and
      a) compare the cold water temperature signal to a target water output temperature in order to generate the diagnostic signal, wherein if the comparison indicates that the temperature of cold water being supplied to the mixer valve is not at least a threshold amount below the target water output temperature, the diagnostic signal is generated to indicate an excess cold water supply temperature failure mode, and/or
      b) compare the cold temperature signal and a minimum system limit in order to generate the diagnostic signal, wherein if the comparison indicates that the temperature of water being supplied to the mixer valve is below the minimum system limit, the diagnostic signal is generated to indicate a cold water temperature supply too low failure mode.

7. The control system of claim 1, wherein the control system further comprises an output stream flow rate sensor arranged to generate an output stream flow rate signal indicative of the rate of flow of the output stream of the mixer valve; and the controller is configured to:
receive the output stream flow rate signal; and
compare the output stream flow rate signal to a threshold value, and if the comparison indicates that the output stream flow rate is less than the threshold value, the diagnostic signal is generated to indicate a blocked or restricted hot and/or cold water supply failure mode, or blocked or restricted outlet failure mode.

8. The control system of claim 1, wherein the controller is further configured to control the mixer valve in response to the diagnostic signal.

9. The control system of claim 8, wherein the controller is arranged to control the mixer valve to at least temporarily reduce the flow rate of hot and/or cold water through the mixer valve or change the one or more target output water properties in response to the diagnostic signal.

10. The control system of claim 1, wherein any one or more of:
a) the controller is further configured to send the diagnostic signal to a user interface and/or a remote device for display and/or storage;
b) the controller is configured to send the diagnostic signal via a wireless connection or via a wired connection; and/or
c) the controller further comprises a memory, and the controller is configured to store the diagnostic signal in the memory.

11. A method performed by a control system for one or more ablutionary devices, the control system comprising a mixer valve having a first inlet and a second inlet configured to receive a supply of hot and cold water and an outlet configured to output cold water, hot water or a mixture thereof as an output stream for supplying water to the one or more ablutionary devices downstream of the mixer valve, the method comprising:
controlling the mixer valve of one or more target output properties by controlling a position of first and second valve members provided in the mixer valve to control flow between the inlets and outlet;
obtaining one or more operating signals each related to an operating parameter of the control system, wherein the one or more operating signals include a hot water temperature signal indicative of the temperature of hot water flowing through or being supplied to at least one of the first or second inlets, and wherein the one or more operating signals include a target or actual position of the one or more valve members; and
generating a diagnostic signal, based at least partly on the hot water temperature signal, that indicates an associated failure mode of the water supply if the mixer valve cannot be controlled to reach the target water output properties, wherein generating the diagnostic signal comprises comparing the valve member target or actual position to a closed threshold and an open threshold, and determining which one or both of the valve member positions are below the closed threshold or exceeding the open threshold in order to determine the failure mode indicated by the diagnostic signal;
wherein when the diagnostic signal is generated, the controller causes at least one of the following actions to occur:
transmitting the diagnostic signal to at least one of a user interface and a remote device; and
transmitting the diagnostic signal to a service company.

12. The method of claim 11, obtaining one or more operating signals comprises receiving the hot water temperature signal.

13. The method of claim 12, wherein generating the diagnostic signal comprises comparing the hot water temperature signal and a target water output temperature of the one or more target output water properties in order to generate the diagnostic signal, wherein if the comparison indicates that the temperature of water being supplied to the mixer valve is not greater than a threshold amount above the target water output temperature the diagnostic signal is generated to indicate an insufficient hot water supply temperature failure mode.

14. The method of claim 12, wherein generating the diagnostic signal comprises comparing the hot water temperature signal to a maximum system limit in order to generate the diagnostic signal, wherein if the comparison indicates that the temperature of water being supplied to the mixer valve is greater than the maximum system limit, the diagnostic signal is generated to indicate an excess hot water supply temperature failure mode.

15. The method of claim 11, wherein the one or more operating signals include a cold water temperature signal indicative of the temperature of cold water being supplied to the mixer valve, and the diagnostic signal is generated based at least partly on the cold water temperature signal.

16. The method of claim 15, wherein:
obtaining the one or more operating signals comprises receiving the cold water temperature signal; and
generating the diagnostic signal comprises:
a) comparing the cold water temperature signal and the target water output temperature in order to generate the diagnostic signal, wherein if the comparison indicates that the temperature of cold water being supplied to the mixer valve is not at least a threshold amount below the target water output temperature the diagnostic signal is generated to indicate an excess cold water supply temperature failure mode; and/or
b) comparing the cold temperature signal and a minimum system limit in order to generate the diagnostic signal, wherein if the comparison indicates that the temperature of water being supplied to the mixer valve is below the minimum system limit, the diagnostic signal is generated to indicate an cold water temperature supply too low failure mode.

17. The method of claim 11, wherein:
the one or more operating signals include an output stream flow rate signal indicative of the rate of flow of the output stream of the mixer valve; and
generating the diagnostic signal comprises comparing the output stream flow rate signal to a threshold value, and if the comparison indicates that the output stream flow rate is less than the threshold value, the diagnostic signal is generated to indicate a blocked or restricted hot and/or cold water supply failure mode, or blocked or restricted outlet failure mode.

18. The method of claim 11, further comprising controlling the mixer valve in response to the diagnostic signal.

19. The method of claim 18, wherein controlling the mixer valve in response to the diagnostic signal comprises controlling the mixer valve to at least temporarily reduce the flow rate of hot and/or cold water through the mixer valve or change the one or more target output water properties in response to the diagnostic signal.

20. The method of claim 11, further comprising any one or more of:
   a) sending the diagnostic signal to a user interface and/or a remote device for display and/or storage;
   b) the diagnostic signal is sent via a wireless connection or via a wired connection; and/or
   c) storing the diagnostic signal in a local memory.

\* \* \* \* \*